United States Patent [19]
Tjutjunnikov et al.

[11] 3,817,501
[45] June 18, 1974

[54] LOWER TRAY OF A COLUMN APPARATUS USED FOR CONTACTING LIQUID AND GASEOUS MEDIA

[76] Inventors: Anatoly Borisovich Tjutjunnikov, ulitsa Feunze, 17, kv. 34; Vitaly Ivanovich Shporkhun, ulitsa Kuibysheva, 11, kv. 6; Alexandr Nikolaevich Marchenko, pereuluck Kolidezny, 47, kv. 2; Galina Panteleimonovna Pochinok, ulitsa Cornaya, 32, kv. 2; Erik Mikhailovich Krivorotchenko, ulitsa Bondaren Kovaskaya, 14/16, kv. 9, all of Kharkov, U.S.S.R.

[22] Filed: Apr. 24, 1972

[21] Appl. No.: 247,004

Related U.S. Application Data

[63] Continuation of Ser. No. 866,292, Oct. 14, 1969, abandoned.

[52] U.S. Cl. ..... 261/79 A, 261/114 VT, 261/114 JP
[51] Int. Cl. ............................................. B01f 3/04
[58] Field of Search ....... 261/114 VT, 114 JP, 79 A

[56] References Cited
UNITED STATES PATENTS

| | | |
|---|---|---|
| 1,983,762 | 12/1934 | Kotzebue ............................ 261/114 |
| 2,718,901 | 9/1955 | Nutter ...................... 261/114 VT X |
| 2,846,204 | 8/1958 | Gilmore ............................... 261/114 |
| 2,863,808 | 12/1958 | Markels, Jr. ..................... 261/114 X |
| 3,062,517 | 11/1962 | Voetter et al. ..................... 261/114 |
| 3,105,862 | 10/1963 | Doering, Jr. ................. 261/114 VT |
| 3,179,389 | 4/1965 | Nutter................................. 261/114 |
| 3,304,694 | 2/1967 | Manger et al. ................ 261/79 A X |
| 3,399,870 | 9/1968 | Zuiderweg et al. ................. 261/114 |

*Primary Examiner*—Tim R. Miles
*Assistant Examiner*—Richard L. Chiesa
*Attorney, Agent, or Firm*—Waters, Roditi & Schwartz

[57] ABSTRACT

A louvered tray of a column apparatus used for providing contact between liquid and gaseous media on the surface of the tray in the course of a uniflow motion of the media, comprising a plurality of louvers and vertical partitions secured in between said louvers on the tray surface and used to direct the liquid to the louvers. Each louver is composed of a plurality of turnable plates which normally rest upon one another but which are raised by the gas when it passes therethrough. The tray provides a uniform distribution of liquid and gas along the surface of the tray and good dispersion of the liquid to insure a great area of contact between the liquid and gas.

8 Claims, 5 Drawing Figures

LOWER TRAY OF A COLUMN APPARATUS USED FOR CONTACTING LIQUID AND GASEOUS MEDIA

CROSS RELATED APPLICATION

This Application is a continuation of application Ser. No. 866,292 filed Oct. 14, 1969 and now abandoned.

The present invention relates to chemical apparatus for carrying out heat and mass exchange between liquid and gaseous media as, for instance, in rectification, distillation and absorption and, more particularly, it relates to designs of trays for column apparatus.

Known in the prior art are louver trays of a column apparatus used for providing contact between liquid and gaseous media, made of a plurality of inclined plates forming slots for the passage of gas. The liquid, supplied onto a tray, is picked up by the gas flow and is carried away to a drain device and, through the latter, onto a subsequent tray.

However, the conventional designs of louver trays with a uniflow movement of the liquid and gas do not provide for a uniform distribution of the liquid along the tray surface. This results in the absence of a uniform contact between the gas and the liquid. Additionally, when manufacturing trays of a large diameter, it is impossible to insure a required accuracy in the size of the slot width, which results in a non-uniform distribution of the gas flow along the slot length. Due to this, some portions of the tray slots admit much gas and others admit little gas. This results in an incomplete contact between the gas and the liquid, or in poor dispersion of the liquid and a small area of contact between the gas and the liquid.

The present invention has as an object the provision of a louver tray for a column apparatus, used for providing a contact between liquid and gaseous media, that insures uniform distribution of the liquid along the surface of the tray and sufficiently fine dispersion of the liquid and, hence, uniform distribution of the liquid and gas along the whole area of the tray and a sufficiently great area of contact between the media.

This object is accomplished by means of a louver tray equipped with devices for receiving and draining the liquid, which comprises a plurality of louvers and vertical partitions secured on its surface portions free of the louvers and used for directing the liquid to the louvers.

It is advantageous to employ centrifugal separators, disposed under the louvers, for separating liquid from gas and secured on a common continuous partition provided with an overflow device. The centrifugal separator may be fashioned as a vertical pipe branch having blades immovably secured thereinside and used to whirl the gas flow, and an annular reflector mounted on the tray lower surface coaxially with said vertical pipe branch and housing a cone partition.

The following description of an exemplary embodiment of the present invention is given with reference to the accompanying drawings, in which.

Figure 1:
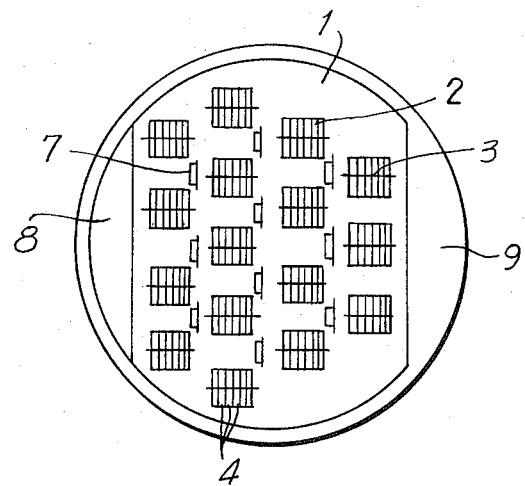
FIG. 1 is an enlarged top view of a louver tray of a column apparatus used for providing a contact between liquid and gaseous media, according to the invention.
Figure 2:
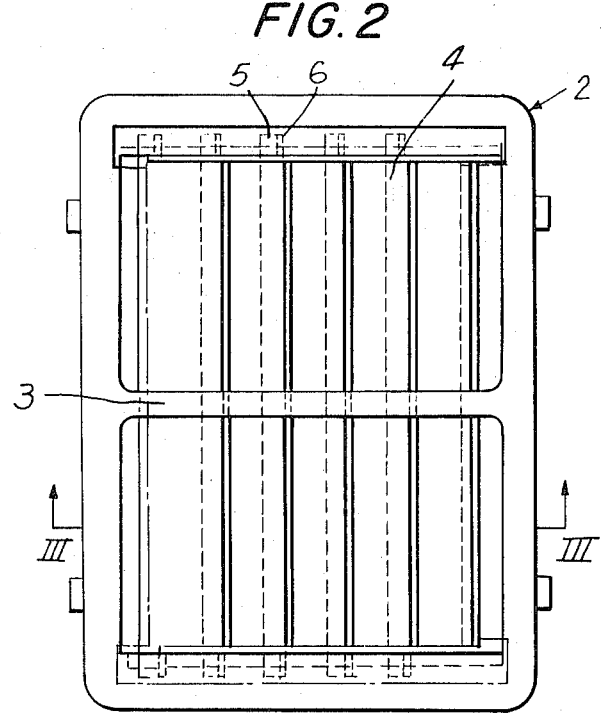
FIG. 2 is an enlarged view of louvers, according to the invention.
Figure 3:
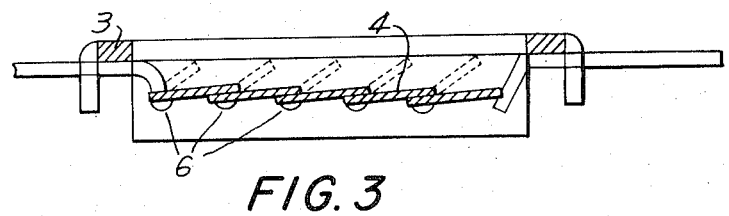
FIG. 3 is a section taken on line III—III OF FIG. 2.

A tray 1 (FIG. 1) is essentially constituted as a plate having louvers 2 fixedly disposed thereon in a staggered order as illustrated, or in any other order. The louvers 2 are provided with stops 3 (FIG. 2) determining the maximum angle of opening. The plates 4 of the louvers 2 have projections 5, by which they enter grooves 6 (FIG. 3) formed in the frame of the louvers 2 in such a manner that the plates 4 are capable of independently turning around respective projections 5 (FIG. 2). When in their non-operating position, i.e., when no gas is supplied, the plates 4 rest upon one another as seen in FIG. 3. However, when gas is supplied, the plates are raised and as shown in dotted outline in FIG. 3 the plates can reach a maximum open position in contact with the stop 3.

Mounted on the surface of the tray 1 (FIG. 1) are conventional vertical partition members 7 used for directing the liquid flow to the louvers 2. The tray 1 also has a device 8 and a device 9, disposed thereon and used, respectively, for receiving and draining the liquid.

Figure 4:
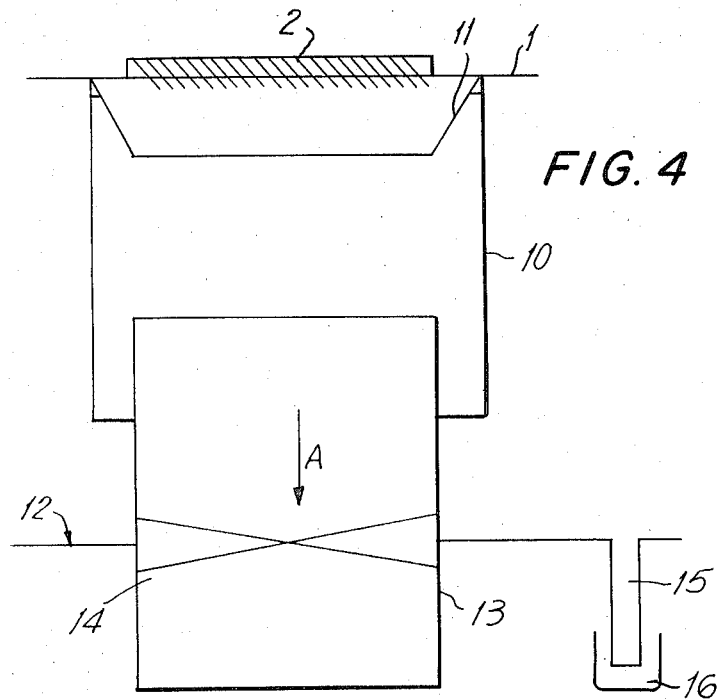
FIG. 4 shows louvers with a centrifugal separator, according to the invention.
Figure 5:
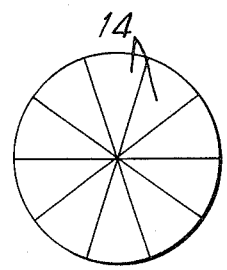
FIG. 5 is a view taken along arrow A of FIG. 4.

Mounted under the louvers 2 are centrifugal separators, each of the separators comprising an annular reflector 10 (FIG. 4) with a cone partition 11 disposed thereinside, and a vertical pipe branch 13 mounted on a partition 12 coaxially with said annular reflector and cone partition 11. The vertical pipe branch 13 accommodates blades 14 (FIGS. 4, 5) turned at an angle with respect to the tray plane and forming a propeller serving to whirl the gas flow.

Provided in the partition 12 (FIG. 4) is a drain pipe branch 15 and a hydraulic lock 16.

The tray operates as follows.

Through the receiving device 8, the liquid is supplied onto the surface of the tray 1 (FIG. 1), mounted in a column apparatus (not shown in the drawing), and moves therealong to the drain device 9. While rising along the apparatus, the gas presses the plates 4 and turns them in the grooves 6 (FIG. 3), thereby forming outlet slots, whose width is proportional to the gas consumption. On leaving the slots, the gas forms a uniflow with the liquid and contacts the latter.

As a result of this, a flow of greatly dispersed gas-and-liquid mixture is formed on the surface of the tray 1 (FIG. 1), which flow is directed by the partitions 7 into the louvers 2.

When separated from the gas-and-liquid mixture, the gas rises along the apparatus to a subsequent tray, carrying away with it a certain amount of fine liquid drops. To separate the drops from the gas, centrifugal separators are mounted under the louvers 2, due to which the gas, before it passes through the louver slots, is supplied into the vertical pipe branch 13 (FIG. 4) to be whirled by the blades 14.

The liquid dispersed in the gas in the form of fine drops is thrown by the centrifugal force onto the walls of the vertical pipe branch 13 and rises therealong. On reaching the upper edge of the vertical pipe branch 13, the liquid is thrown over onto the walls of the annular reflector 10, and flows down the partition 12, via the drain pipe branch 16 and the hydraulic lock 17, back into the tray, from which it has been carried away.

The cone partition 11 prevents the liquid from getting from the inner surface of the annular reflector 10 onto a higher tray, and decreases losses in the pressure of the gas flow coming out from the vertical pipe branch 13, thus attributing to its smooth expansion. Through the slots between the plates 4, the refined gas is supplied onto a higher tray.

With the louver made as a separate unit, it is possible to insure the manufacture of trays of any diameter from standard parts and, hence, to rapidly develop their mass production. The volume of the welding operations, performed when manufacturing these trays, is insignificant, which is of particular importance when using trays in aggressive media which, as a rule, destroy the welded joints first.

Owing to the fact that the louvers are disposed along the tray surface as separate units, and that the vertical partitions are used to prevent the liquid from flowing through the tray without contacting the gas, it is possible to obtain a highly turbulent flow of the gas-and-liquid mixture and a large area of contact between the media, which provides for a substantial increase in the efficiency of the tray operation. As a result, the tray possesses a high efficiency factor within a wide range of gas and liquid consumption.

In case it is necessary to obtain highly refined products, it is recommended to use trays provided with centrifugal separators.

Another important advantage of the proposed tray lies in the fact that even in case the consumption of liquid used is great, the hold up at any point of the tray remains constant, which is especially important when carrying out gas separation processes.

What is claimed is:

1. A louver tray for a column apparatus used for providing contact between liquid and gaseous media on the surface of the tray in the course of a uniflow motion of the media, said tray comprising means providing a tray surface, at least two louvers on said surface each including movable plates defining slots for passage of the gas; vertical partitions secured on said tray surface free of said louvers and adapted for directing the liquid to said louvers; means for receiving the liquid disposed on said tray surface; and means for draining the liquid disposed on said tray surface.

2. A tray according to claim 1 comprising under said louvers, centrifugal separators for separating liquid from gas, a common continuous horizontal partition to which said separators are secured, and an overflow device on said partition.

3. A tray according to claim 2, in which said centrifugal separator includes a vertical pipe branch, blades immovably secured inside said pipe branch to whirl the gas flow, an annular reflector mounted beneath the tray surface and coaxially with the vertical pipe branch, and a cone partition in said reflector.

4. A louver tray according to claim 3 wherein said reflector has a lower end which surrounds the pipe branch in spaced relation at the upper end of the latter.

5. A louver tray according to claim 1 wherein the plates of each said louver have respective opposite ends with projections thereat supported for individual turning movement.

6. A louver tray according to claim 1 wherein said louvers are distributed in staggered order on said tray surface.

7. A louver tray according to claim 4 wherein said plates rest on one another in overlapped fashion in the absence of gas flow therethrough.

8. A louver tray according to claim 7 comprising stop strips on said louvers for limiting the turning of the individual plates.

* * * * *